(12) United States Patent
Mostert

(10) Patent No.: US 7,533,935 B2
(45) Date of Patent: May 19, 2009

(54) CHILD VEHICLE SEAT

(75) Inventor: Marc Mostert, Sittard (NL)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/943,396

(22) Filed: Nov. 20, 2007

(65) Prior Publication Data

US 2008/0116729 A1    May 22, 2008

(30) Foreign Application Priority Data

Nov. 21, 2006   (NL) .................................. 1032908

(51) Int. Cl.
*A47D 1/10* (2006.01)
(52) U.S. Cl. .................. 297/254; 297/255; 297/256
(58) Field of Classification Search ................ 297/254, 297/255, 256
See application file for complete search history.

(56) References Cited

U.S. PATENT DOCUMENTS

| | | | |
|---|---|---|---|
| 3,632,165 A | | 1/1972 | Miller |
| 3,828,994 A | * | 8/1974 | Hollins .................... 297/254 X |
| 5,332,285 A | * | 7/1994 | Sinnhuber ............... 297/254 X |
| 6,729,687 B2 | * | 5/2004 | Haverkamp ................ 297/254 |
| 7,165,809 B2 | * | 1/2007 | Downey ..................... 297/253 |
| 2007/0176477 A1 | * | 8/2007 | Maciejczyk ............... 297/254 |

FOREIGN PATENT DOCUMENTS

| | | | |
|---|---|---|---|
| DE | 3704972 A1 * | 9/1988 | ................ 297/254 |
| DE | 19732385 | 1/1999 | |
| DE | 10213655 | 7/2003 | |
| DE | 4230879 | 11/2007 | |
| EP | 1621394 | 11/2007 | |
| FR | 2814994 | 4/2002 | |
| FR | 2870487 | 11/2005 | |

OTHER PUBLICATIONS

International Search Report, NL1032908, dated Jun. 7, 2007.

* cited by examiner

*Primary Examiner*—Rodney B White
(74) *Attorney, Agent, or Firm*—Barnes & Thronburg LLP

(57) ABSTRACT

A child vehicle seat is suitable for being placed on a vehicle seat provided with a headrest. The headrest is connected to the vehicle seat by means of at least two uprights. The child vehicle seat at least comprises a backrest and means for connecting said backrest to said headrest in use. Said means can be connected to the two uprights in use. The means comprise at least one hook-shaped element which is movable with respect to the backrest, wherein the headrest can remain connected to the vehicle seat in use while said means are being connected to and disconnected from the two uprights.

14 Claims, 9 Drawing Sheets

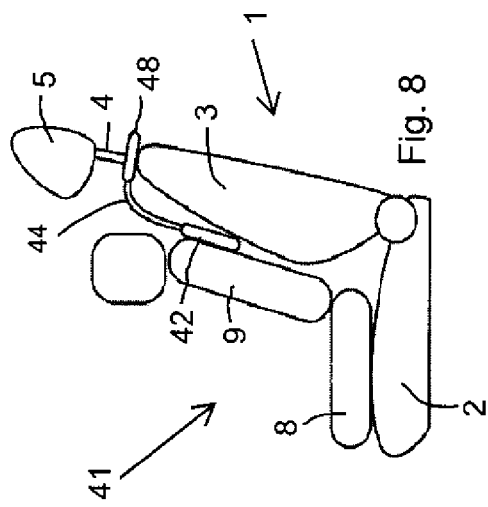
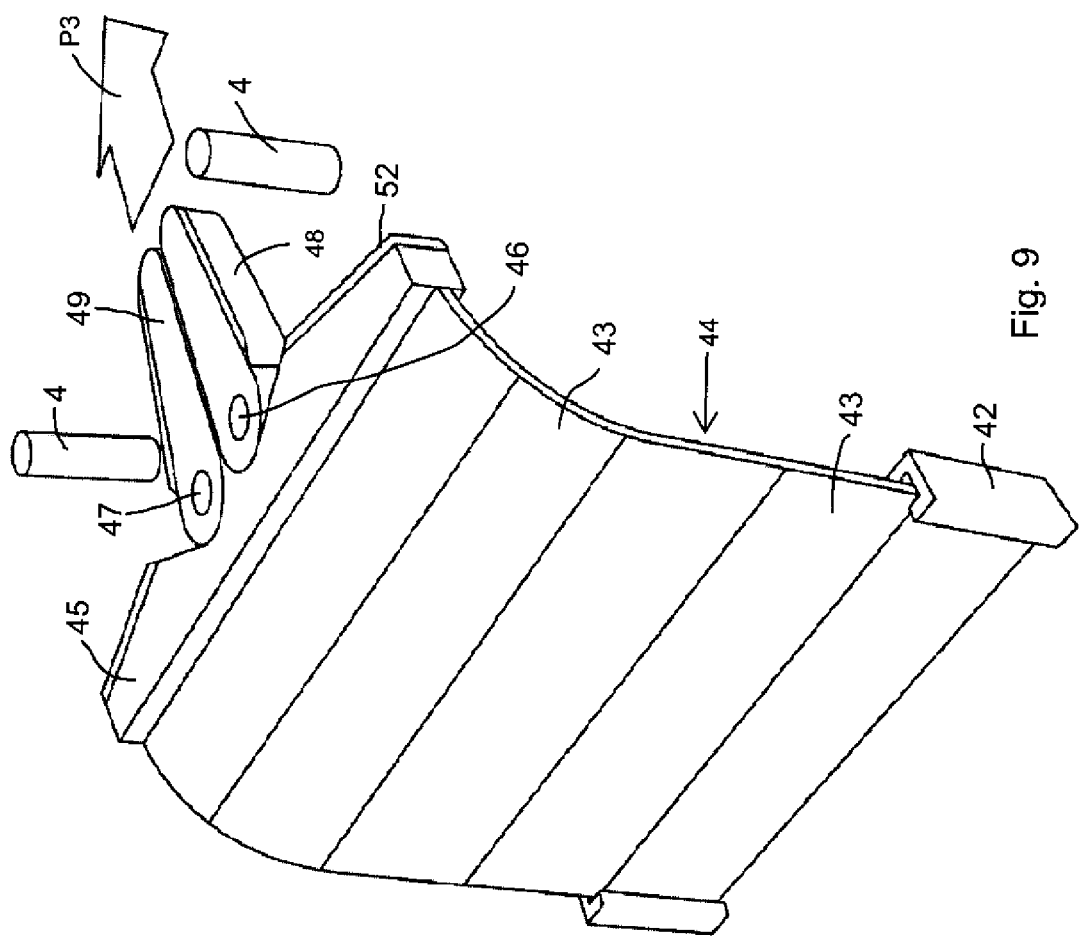

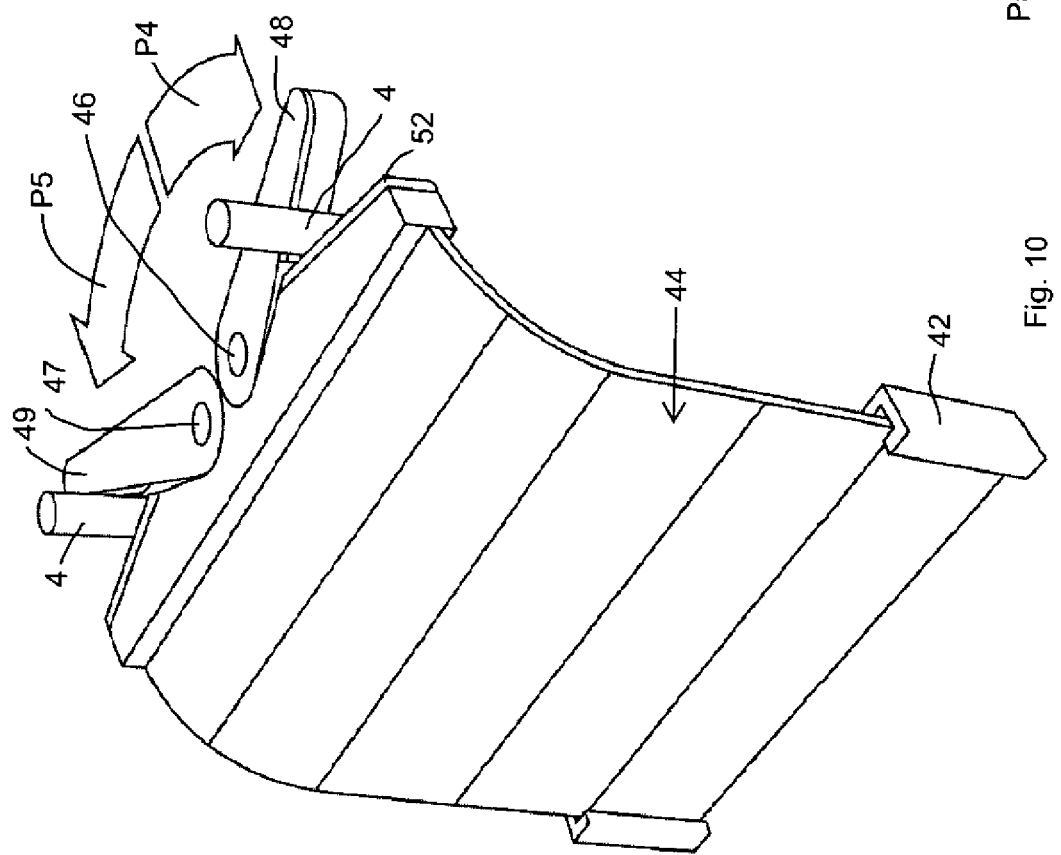

CHILD VEHICLE SEAT

The invention relates to a child vehicle seat suitable for being placed on a vehicle seat provided with a headrest, which headrest is connected to the vehicle seat by means of at least two uprights, which child vehicle seat at least comprises a backrest and means for connecting said backrest to said headrest in use.

Such a child vehicle seat, which is known from U.S. Pat. No. 5,332,285, comprises a frame and a seat portion mounted to the frame, as well as a backrest connected thereto. The frame is provided with a horizontally extending rod on a side of the backrest remote from the seat portion.

The child vehicle seat is suitable for being placed on a vehicle seat provided with a headrest, which headrest is detachably connected to the vehicle seat by means of two uprights.

To connect the child vehicle seal to the vehicle seat, the headrest is removed from the vehicle seat. Then the child vehicle seat is placed on the vehicle seat, after which the headrest is connected to the vehicle seat again. The frame extends between the uprights in this situation, and the rod is positioned on a side of the uprights remote from the backrest. The rod functions as a means for connecting the backrest to the headrest in that case. Undesirable movement of the child vehicle seat with respect to the vehicle seat is prevented in a simple manner by said connection.

A drawback of the known child vehicle seat, however, is the fact that the headrest must first be removed before the child vehicle seat can be detached from the vehicle seat.

The object of the invention is to provide a child vehicle seat by means of which the backrest of the child vehicle seat can be connected to and disconnected from the headrest of the vehicle seat in a simple manner.

This object is accomplished with the child vehicle seat according to the invention in that said means can be connected to the two uprights in use, which means comprise at least one hook-shaped element which is movable with respect to the backrest, wherein the headrest can remain connected to the vehicle seat in use while said means are being connected to and disconnected from the two uprights.

Since the hook-shaped element is movable with respect to the backrest, the hook-shaped element can be readily connected to and disconnected from the headrest or the uprights via which the headrest is connected to the vehicle seat. In addition, because the hook-shaped element is movable, the hook-shaped element can take up several different positions relative to the child vehicle seat, as a result of which said connecting and disconnecting can take place in a comparatively simple manner. The headrest need not be removed from the vehicle seat for said connecting and disconnecting.

It is noted that from FR-2,814,994, DE-49.73.238 and FR-2,870,487 child vehicle seats are known in which a construction is attached to the uprights, wherein the headrest must be removed from the vehicle seat in order to attach the construction. Subsequently, the backrest of the child vehicle seat can be connected to said construction. A drawback of these known child vehicle seats, however, is the fact that when the child vehicle seat is to be used in another vehicle, the headrest must first be removed in order to be able to detach the construction. Subsequently, the headrest of the other vehicle must be detached again, the construction must be attached, after which the headrest must be mounted in place again. This renders the use of the child vehicle seat in different vehicles labourious. In addition, the use of a construction separate from the child vehicle seat has the disadvantage that it can be lost.

One embodiment of the child vehicle seat according to the invention is characterised in that the hook-shaped element comprises a plate-shaped element which, in use, can be connected to the two uprights by which the headrest is connected to the vehicle seat.

The plate-shaped element is passed through the opening between the two uprights in order to be connected to said uprights, with the plate-shaped element taking up a slightly oblique position relative to the child vehicle seat. After the plate-shaped element has been passed through the opening present between the two uprights, the plate-shaped element is brought into abutment with the uprights from a side of the headrest remote from the backrest. It is also possible to fit the hook-shaped element around the uprights.

Another embodiment of the child vehicle seat according to the invention is characterised in that the plate-shaped element has a length greater than the distance by which the two uprights are spaced apart.

When such a length is used, the plate-shaped element extends beyond the uprights on either side in use. In this way a comparatively simple, firm connection of the backrest to the headrest is obtained.

Yet another embodiment of the child vehicle seat according to the invention is characterised in that said means comprise at least two hook-shaped elements, which can each be connected to uprights arranged adjacent to each other, via which the headrest is connected to the vehicle seat.

Each of said hook-shaped elements may be separately connected to one of the uprights, as a result of which a stable connection is obtained independently of the spacing between the uprights.

It is also possible to fit the two hook-shaped elements round the uprights and connect them together on a side of the headrest remote from the backrest.

Another embodiment of the child vehicle seat according to the invention is characterised in that the hook-shaped element is connected to the backrest by means of an elastic element.

The elastic element makes it possible to move the hook-shaped element and adapt it to various vehicle seats and associated headrests in a simple manner. In addition, the use of the elastic element makes it easy to pass the hook-shaped element between or around the uprights, which hook-shaped element is pulled tightly against the headrest or the uprights of the headrest under the influence of the spring force of the elastic element when the hook-shaped element is being released.

Yet another embodiment of the child vehicle seat according to the invention is characterised in that the hook-shaped element abuts against the backrest under the influence of spring force of the elastic element in the situation in which the hook-shaped element is disconnected from the headrest.

In this way the hook-shaped element is put away on the backrest in a simple manner and does not form a projecting element of the child vehicle seat.

The hook-shaped element can thus be arranged round the headrest or the uprights of the headrests in a simple manner.

Another embodiment of the child vehicle seat according to the invention is characterised in that the hook-shaped element is pivotally connected to the backrest.

Yet another embodiment of the child vehicle seat according to the invention is characterised in that the backrest is provided with a recess, in which at least the hook-shaped element can be stowed away.

The hook-shaped element can thus be stowed away in a simple manner, for example when the child vehicle seat is used outside the vehicle.

Yet another embodiment of the child vehicle seat according to the invention is characterised in that said means comprise hook-shaped elements which are pivotable about pivot axes, which hook-shaped elements can be pivoted from a first position, in which the hook-shaped element can be moved between the two uprights in use, to a second position, in which the hook-shaped elements abut against the uprights on a side remote from the vehicle seat, and vice versa.

Such pivotable hook-shaped elements can be easily passed between the uprights and subsequently be connected to said uprights substantially independently of the spacing between the uprights.

Yet another embodiment of the child vehicle seat according to the invention is characterised in that the hook-shaped elements each comprise a toothing extending around the pivot axis, which toothings are in mesh with each other.

In this way it is ensured that the hook-shaped elements are each pivoted over the same distance about the pivot axes, albeit in opposite directions, so that a stable connection to the uprights is realised.

Yet another embodiment of the child vehicle seat according to the invention is characterised in that said means comprise a control element, by means of which at least one hook-shaped element can be moved from said first position to said second position in use through contact of the control element with an upright.

In this way the hook-shaped element will be automatically moved to said second position upon contact between the upright and the control element. This further enhances the ease of operation.

The invention will now be explained in more detail with reference to the drawings, in which:

FIG. 8 is a side view of another embodiment of a child vehicle seat according to the invention;

FIG. 9 is a perspective view of a part of the child vehicle seat shown in FIG. 8, in which the hook-shaped elements are shown in a first position thereof;

FIG. 10 is a perspective view of a part of the child vehicle seat shown in FIG. 8, in which the hook-shaped elements are shown in a second position thereof;

FIG. 11 is a top plan view of the hook-shaped elements of the part shown in FIGS. 9 and 10 of the child vehicle seat shown in FIG. 8.

Like parts are indicated by the same numerals in the figures.

Figure 1:
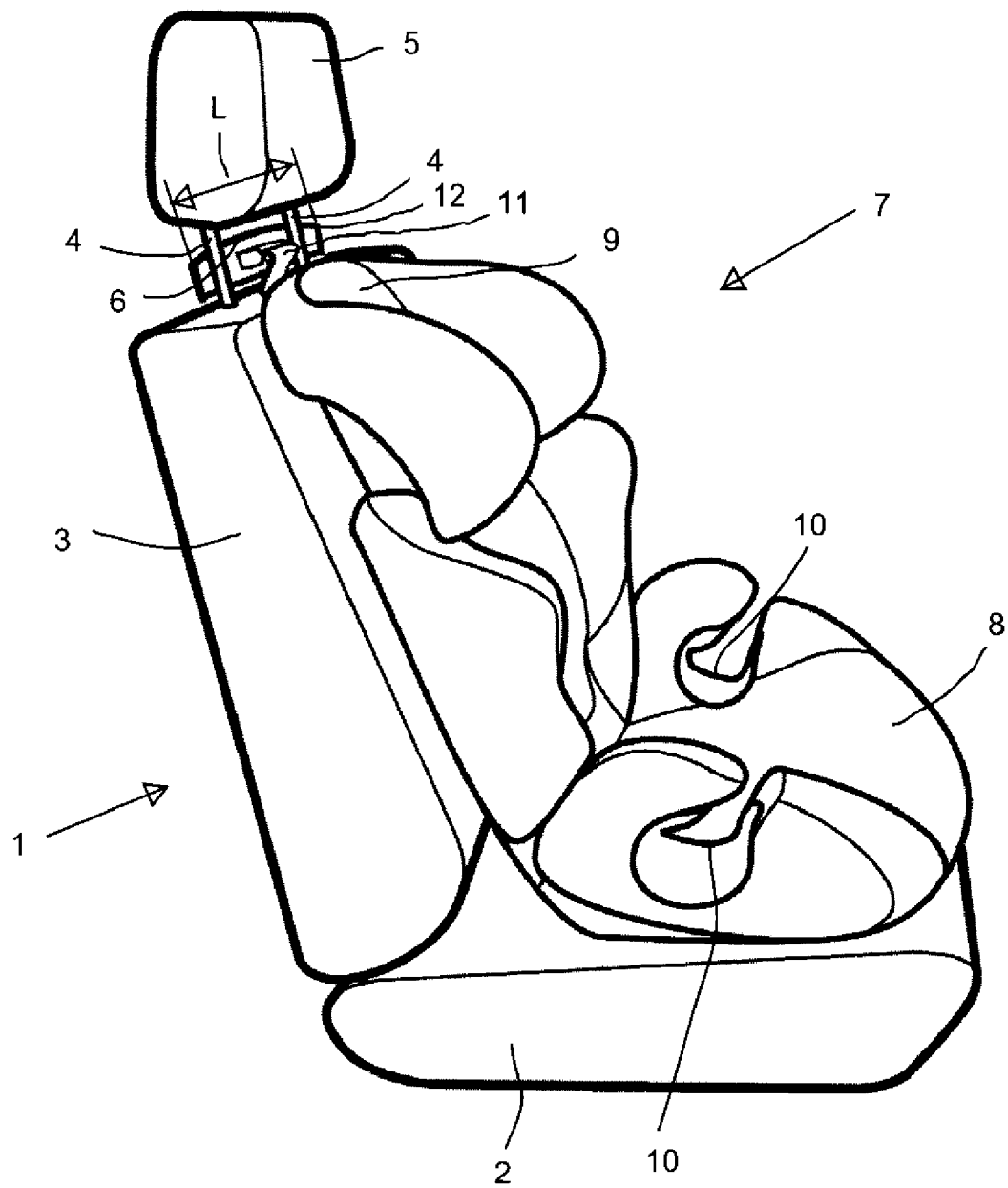
FIG. 1 is a perspective view of a child vehicle seat according to the invention.

FIG. 1 shows a vehicle seat 1 comprising a seat portion 2, a back portion 3 and a headrest 5 connected to the back portion 3 via two uprights 4. A passage 6 is present between the headrest 5, the uprights 4 and the back portion 3. Such a vehicle seat is known per se and will not be explained in detail, therefore.

A child vehicle seat 7 is placed on the vehicle seat 1, which child vehicle seat 7 comprises a seat portion 8 and a backrest 9 connected thereto. A child seated in the child vehicle seat 7 is connected to the vehicle seat 1 by means of a three-point seat belt (not shown) present in the vehicle. A lap belt portion of the three-point seat belt extends along guides 10 provided on either side of the seat portion 8. Such a child vehicle seat 7 is suitable for children of, for example, four years and older.

When the child is to be taken out of the child vehicle seat 7, the three-point seat belt is unfastened, after which the child can get out of the child vehicle seat 7. Usually, the three-point seat belt is not used again until the child is put in the child vehicle seat 7 again.

The child vehicle seat 7 as described so far is known per se and will not be explained in detail, therefore. A drawback of such a known child vehicle seat 7 is the fact that the child vehicle seat 7 is loosely positioned on the vehicle seat 1 after the three-point seat belt has been unfastened. The child vehicle seat will shift from its position on the vehicle seal when the vehicle brakes or takes a sharp bend, and in case of a collision it will even shoot forward through the vehicle.

In order to prevent the child vehicle seat 7 from moving through the vehicle in an uncontrolled manner, for example when braking or taking bends, the child vehicle seat 7 according to the invention is provided with a flexible band 11 forming an elastic element, which is connected to the backrest 9 at one end and which is provided with a plate-shaped element 12 on a side remote from the backrest 9. The plate-shaped element 12 forms a hook-shaped element, with the length L of the plate-shaped element 12 being greater than the distance by which the uprights 4 of the headrest 5 are spaced apart. Said length L has been selected so that it is greater than the spacing between the uprights 4 of all the usual types of headrests 5.

Figure 2:
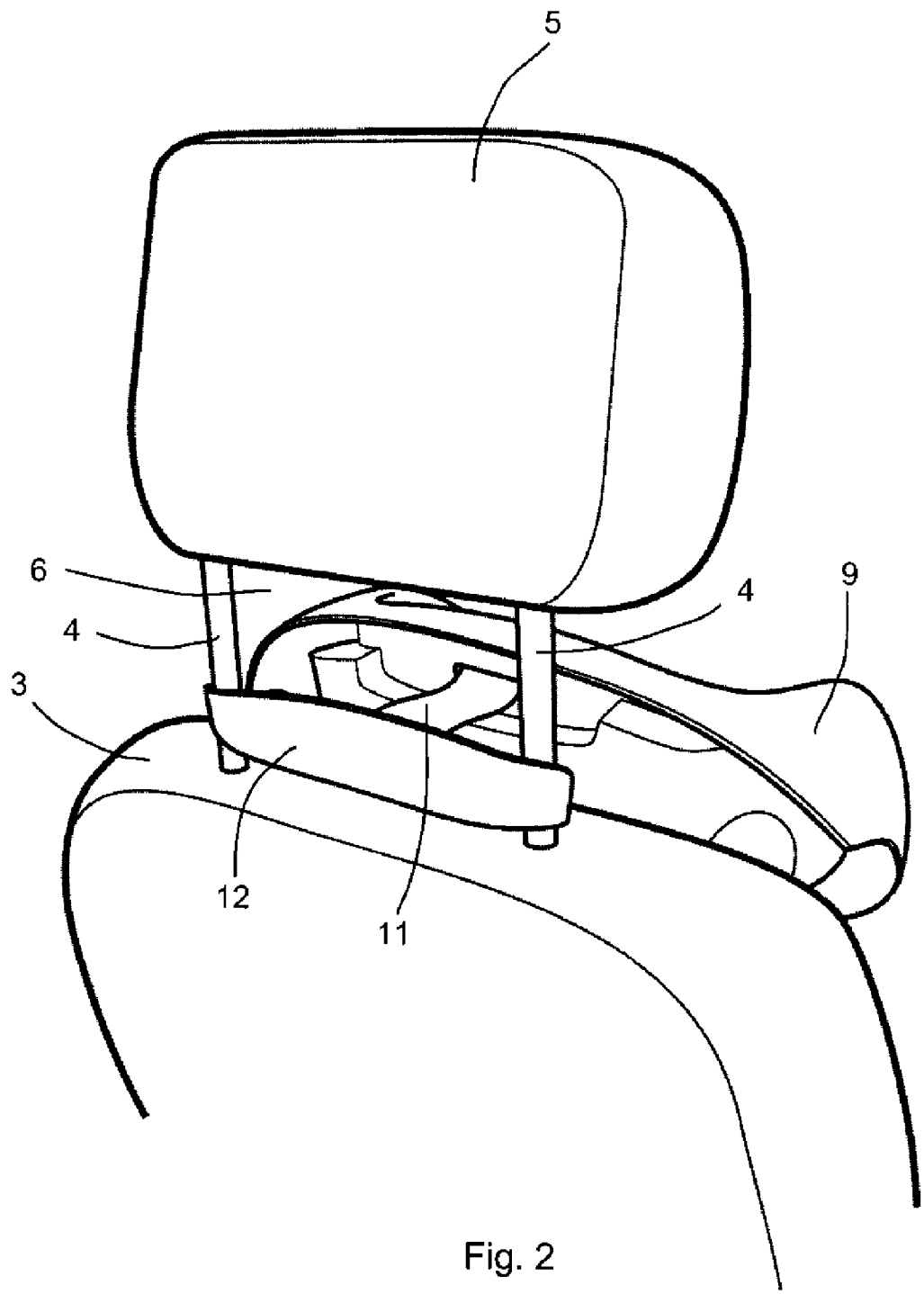
FIG. 2 is a perspective rear view of a part of the child vehicle seat according to the invention shown in FIG. 1.
Figure 3:
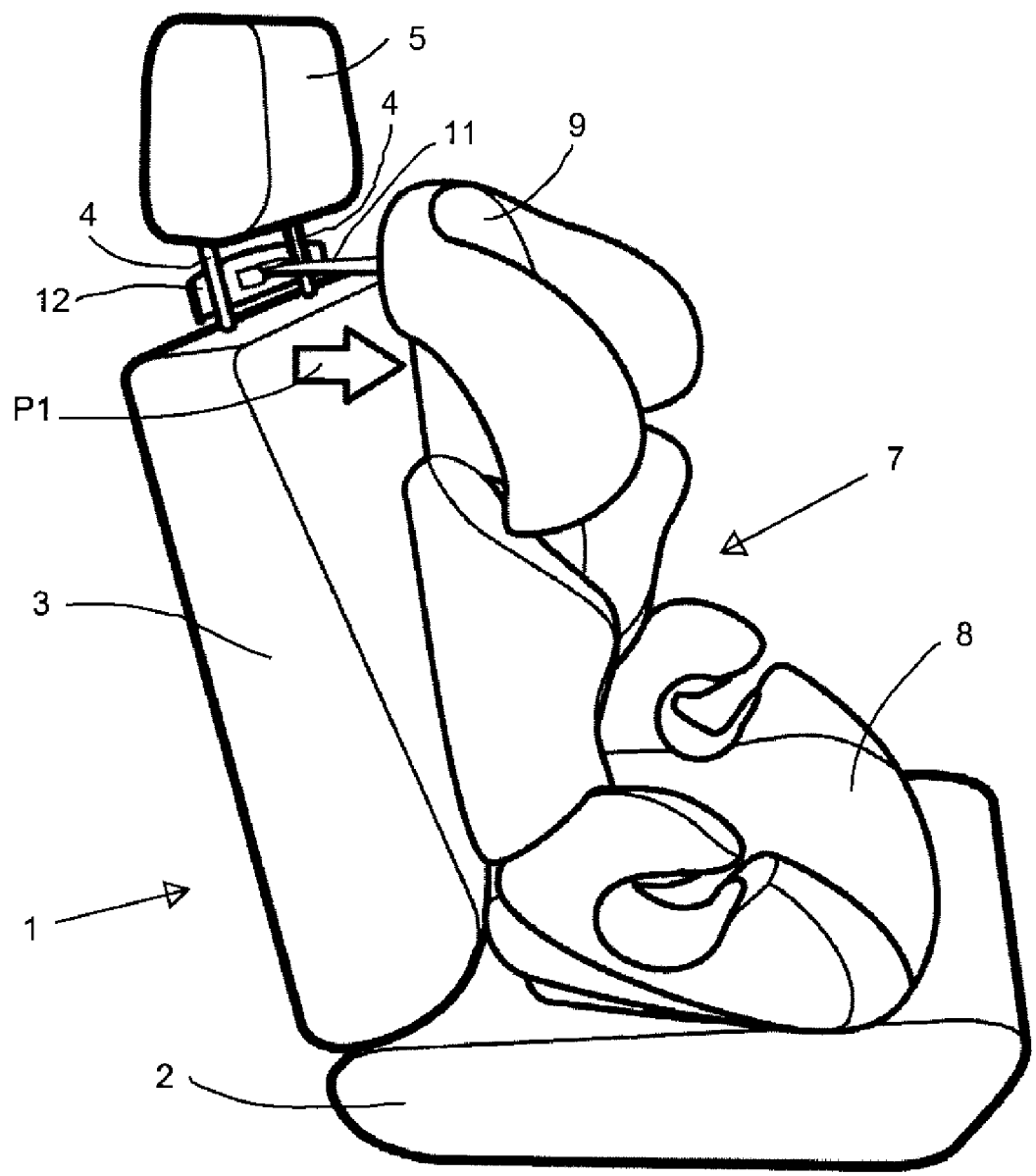
FIG. 3 shows the child vehicle seat according to the invention shown in FIG. 1 during braking of a vehicle.

As is clearly shown in FIG. 2, the plate-shaped element 12 extends over the uprights 4 on a side of the headrest 5 remote from the backrest 9 and abuts against the uprights 4 under the influence of spring force of the elastic flexible band 11.

Figure 4:
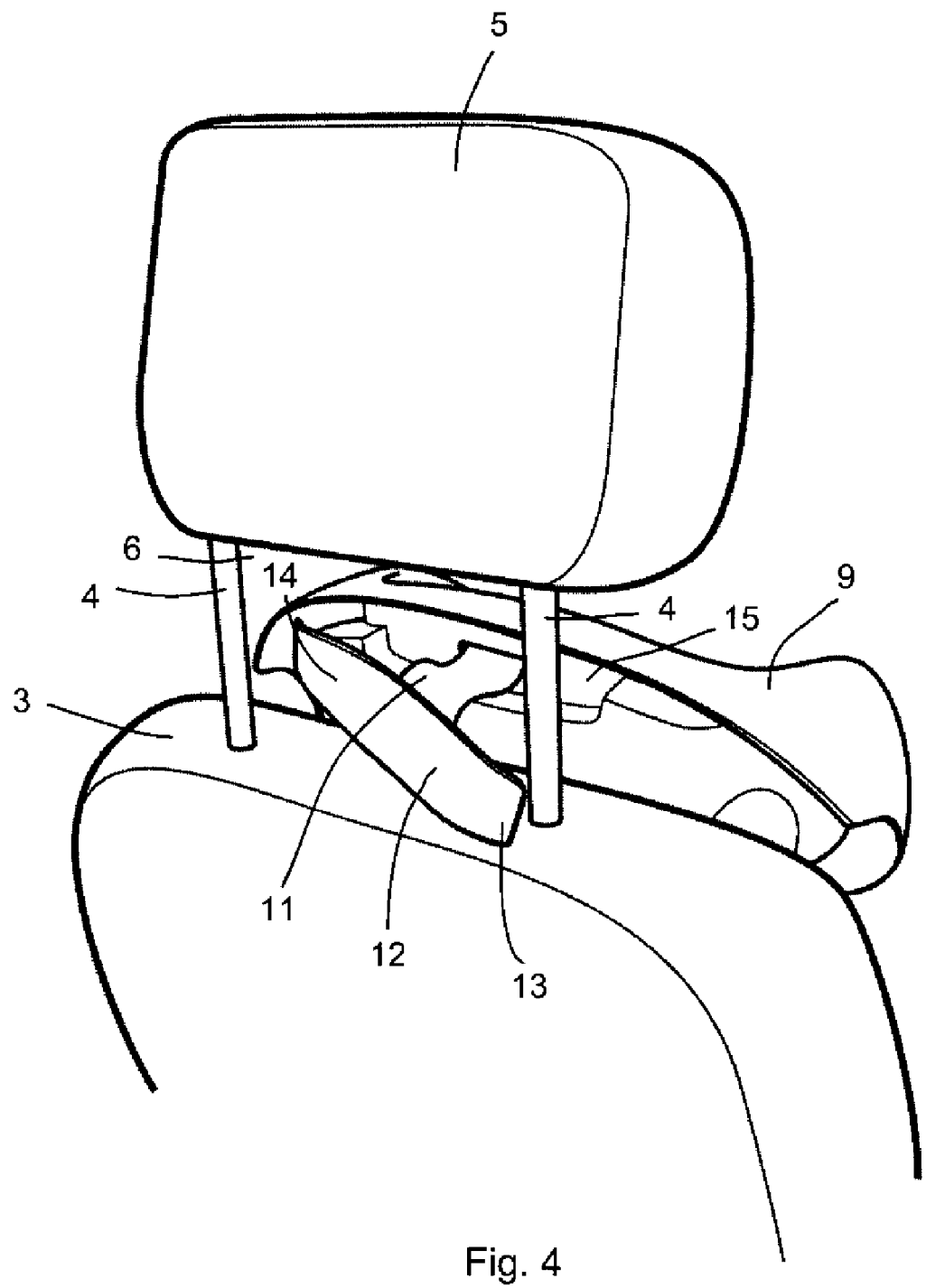
FIG. 4 is a perspective rear view corresponding to FIG. 2 during the attachment of the hook-shaped element of the child vehicle seat according to the invention.

The manner in which the plate-shaped element 12 is fitted between and behind the uprights 4 is shown in FIG. 4. The plate-shaped element 12 is turned relative to the backrest 9 in such a manner that one end 13 of the plate-shaped element can be inserted through the passage 6 until the other end 14 of the plate-shaped element 12 has passed through the passage 6 as well. The plate-shaped element 12 is then tilted to the position in shown in FIG. 2. To disconnect the plate-shaped element 12 from the vehicle seat 1, the plate-shaped element 12 is first moved away from the uprights 4 until one end 13, 14 can be inserted into the passage 6 and subsequently the entire plate-shaped element 12 can be passed through the passage 6.

As already indicated above, when the child vehicle seat 7 is being used by a child, the child is connected to the vehicle seat 1 together with the child vehicle seat 7 by means of a three-point seat belt. In case of a collision, the forces exerted on the child and the child vehicle seat 7 are taken up by the three-point seat belt. Moreover, because of the connection between the backrest 9 and the headrest 5, sideways movement of the child vehicle seat is prevented in a simple manner.

Once the child has got out of the child vehicle seat 7, the child vehicle seat 7 remains behind in the vehicle, but usually the three-point seat belt is not used for fixing the empty child vehicle seat 7 in position. When the vehicle suddenly brakes or takes a sharp bend, the child vehicle seat 7 according to the invention will be moved in the direction indicated by the arrow P1, resulting in elastic deformation of the flexible band 11. The child vehicle seat 7 is effectively prevented from moving further in the direction indicated by the arrow P1, however, by the flexible band 11 and the plate-shaped element 12, which is in engagement with the uprights 4. As a result, the child vehicle seat 7 will not be moved undesirably through the vehicle.

According to another possibility, the flexible band 11 is not an elastic but has a length such that the plate-shaped element 12 can be guided through the passage 6 of vehicle seats 1 of varying dimensions in a simple manner.

The backrest 9 is preferably provided with a recess 15 in which a plate-shaped element 12 that has been disconnected from the headrest 5 is accommodated under the influence of the spring force of the elastic band 11. In this way the plate-shaped element 12 is stowed away and hidden from view in a simple manner.

Figure 5:
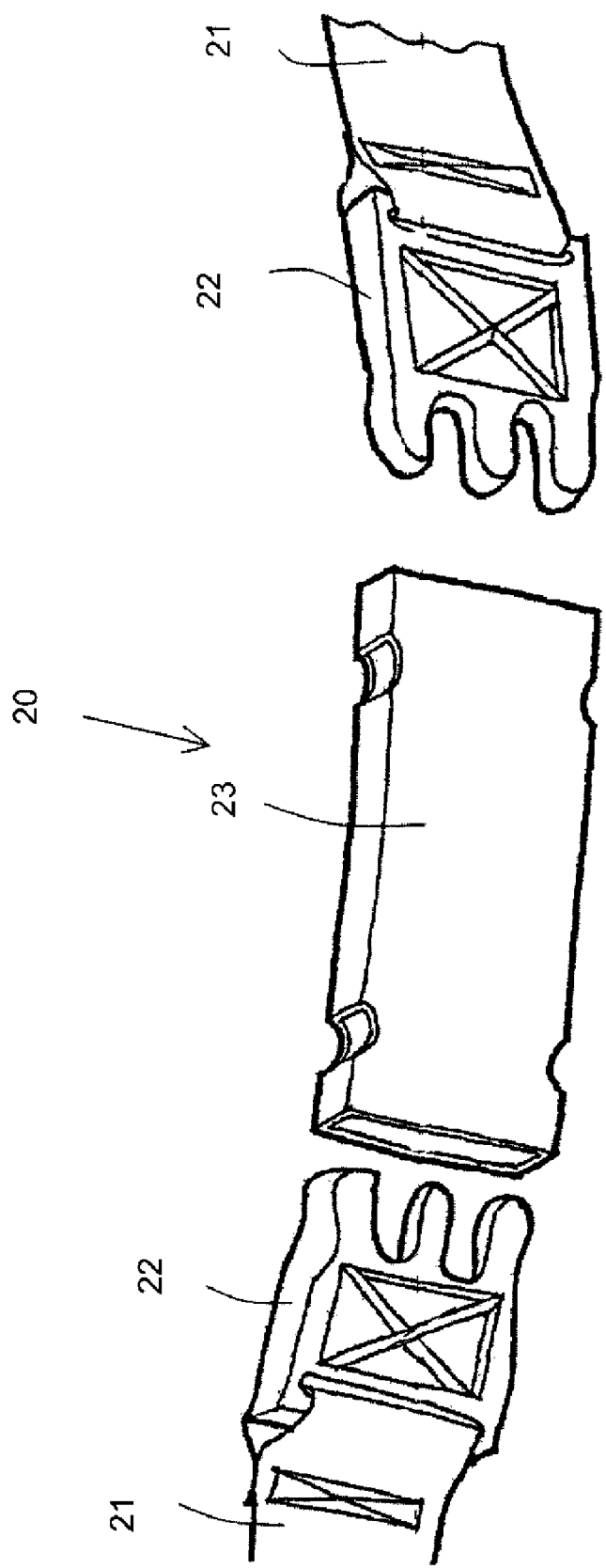
FIG. 5 shows another embodiment of the hook-shaped element according to the invention.

FIG. 5 shows another embodiment of means for connecting the backrest 9 to the headrest in use. Said means comprise two bands 21, 22 forming flexible elements, which are each connected to a long side of the backrest 9 with one end. An end remote from said long sides of each band 21 is provided with a buckle 22 forming a hook-shaped element, which can be detachably connected to a connecting piece 23.

In a position in which the buckles 22 are disconnected from the connecting piece 23, the bands 21 are passed round the uprights 4, after which the buckles 22 are connected to the connecting piece 23 on a side of the headrest 5 remote from the backrest 9.

It is also possible, of course, to provide a band 22 with a buckle 22, whilst the other band 21 is provided with the connecting piece 23.

Figure 6:
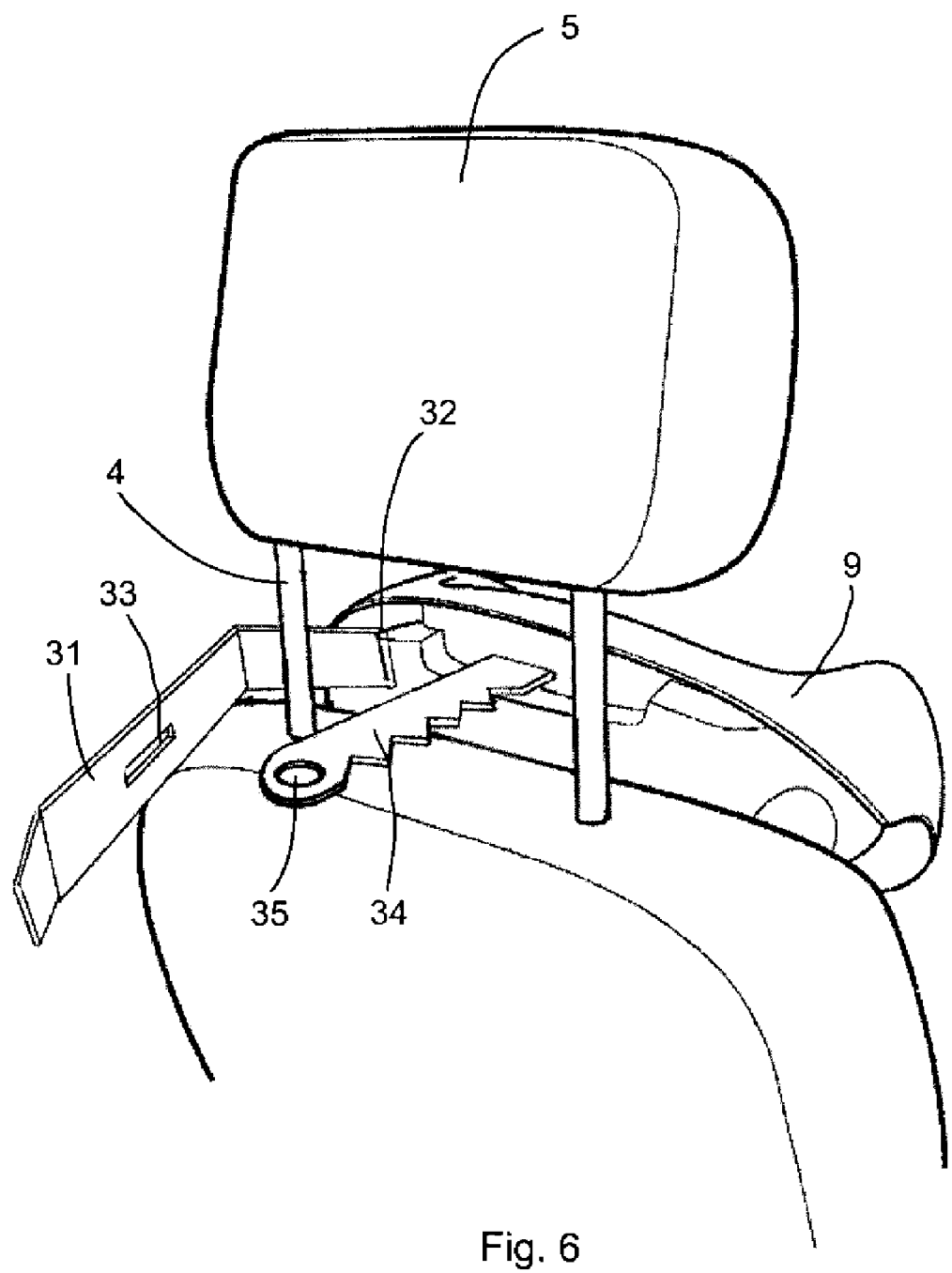
FIGS. 6 and 7 are perspective views of yet another embodiment of the child vehicle seat according to the invention with a hook-shaped element disconnected from the headrest and a hook-shaped element connected to the headrest, respectively.
Figure 7:
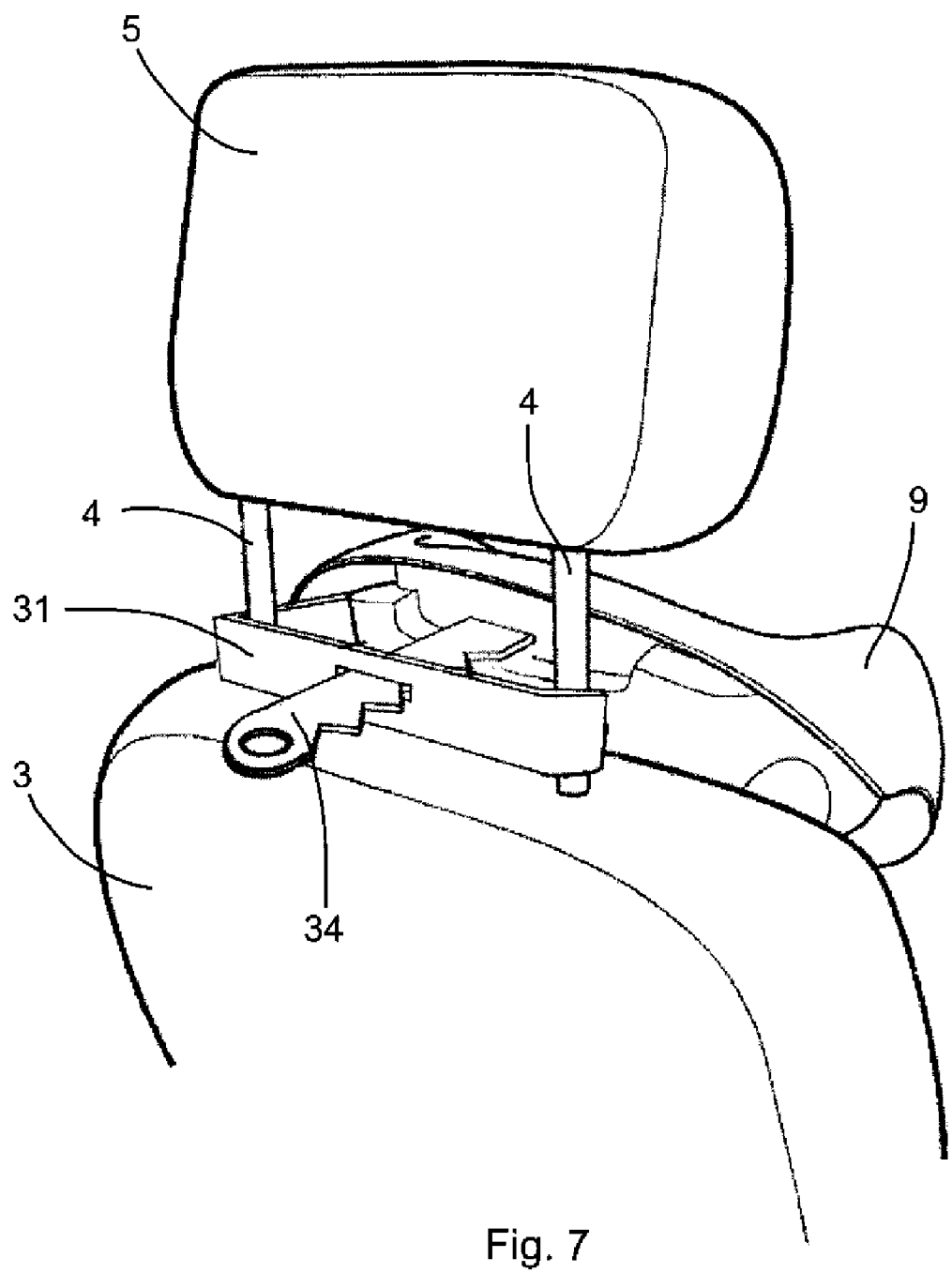

FIGS. 6 and 7 show another embodiment of a child vehicle seat according to the invention, in which the backrest 9 is provided with a hook-shaped element 31, which is connected to the backrest 9 via a substantially vertically extending pivot pin 32. The hook-shaped element 31 is provided with a substantially horizontally extending slot 33. A plate-shaped strip 34 provided with teeth extends from the centre of the backrest 9. At an end remote from the backrest 9, the strip is provided with an eye 35. To connect the child vehicle seat to the headrest 5, the strip 34 is passed between the uprights 4, whilst the hook-shaped element is pivoted around the two uprights 4. Upon said pivoting, the strip 34 is passed through the slot 33. The edge of the strip 33 is thereby brought into engagement with the teeth on the strip 34. If desired, a lock can be provided through the eye 35, so that removal of the child vehicle seat from the vehicle seat is prevented in a simple manner. The slot 33 and the teeth on the strip 34 function as a kind of toothed rack, making it possible to pull the backrest 9 tightly against the vehicle seat 3.

FIG. 8 shows a side view of a child vehicle seat 41 according to the invention, which comprises a seat portion 8 and a backrest 9 connected thereto. The backrest 9 is provided with a guide 42 on a side remote from the seat portion 8, in which guide a strip 44 comprising pivotally interconnected slats 43 is slidably accommodated. On a side remote from the guide 42, said strip 44 is provided with a support element 45 as well as with two hook-shaped elements 48, 49 which are pivotally connected to the support element 45 about pivot axes 46, 47. The hook-shaped elements 48, 49 are provided with toothings 50, 51 around the pivot axes 46, 47, which toothings are in mesh with each other. In the first position of the hook-shaped elements 48, 49 shown in FIG. 9, the hook-shaped elements 48, 49 extend substantially parallel to each other and can be easily moved in the direction indicated by the arrow P3 between two side-by-side uprights 4 of the headrest 5 until the support element 45 abuts against the uprights 4. The support element 45 is preferably provided with a control element 52 comprising a sensor, which, upon making contact with the uprights 4, releases the hook-shaped elements 48, 49 to pivot in the directions indicated by the arrows P4, P5 (see FIG. 10) about the pivot axes 46, 47 under the influence of spring force (not shown). The hook-shaped elements 48, 49 thus come to abut against the uprights 4 on a side of the uprights 4 remote from the child seat 41. The elements 48, 49 are called hook-shaped because they engage around the uprights 4. The elements 48, 49 are configured as tapered bars in the embodiment shown in FIGS. 9, 10. It is also possible, of course, to provide the elements 48, 49 with physical hooks at ends remote from the pivot axes 46, 47.

After the hook-shaped elements 48, 49 have been pivoted in the directions indicated by the arrows P4, P5, a user can pivot a hook-shaped element 48, 49 further about the pivot axis 46, 47, whilst simultaneously the other hook-shaped element 48, 49 is pivoted about the associated pivot axis as well as a result of the meshing engagement between the toothings 50, 51. The hook-shaped elements 48, 49 are locked in the second position (not shown), so that the hook-shaped elements 48, 49 are prevented from undesirably becoming detached from the uprights 4 in a simple manner. The locking engagement of the hook-shaped elements 48, 49 must first be released (not shown) before said elements can be pivoted back from the second position shown in FIG. 10 to the first position shown in FIG. 9.

According to another possibility, the hook-shaped element is connected to the backrest by means of a flexible, albeit non-elastic element.

It is also possible to mount a kind of automatic roll-up mechanism in the upper side of the child vehicle seat, which maintains the band 11 at the correct length thereof.

The invention claimed is:

1. A child vehicle seat suitable for being placed on a vehicle seat provided with a headrest, which headrest is connected to the vehicle seat by means of at least two uprights, which child vehicle seat at least comprises a backrest and means for connecting said backrest to said headrest in use, wherein said means can be connected to the two uprights in use, which means comprise at least one hook-shaped element which is movable with respect to the backrest, wherein the headrest can remain connected to the vehicle seat in use while said means are being connected to and disconnected from the two uprights and wherein the hook-shaped element is connected to the backrest by means of an elastic element.

2. A child vehicle seat according to claim 1, wherein the hook-shaped element comprises a plate-shaped element which, in use, can be connected to the two uprights by which the headrest is connected to the vehicle seat.

3. A child vehicle seat according to claim 2, wherein the plate-shaped element has a length greater than the distance by which the two uprights are spaced apart.

4. A child vehicle seat according to claim 1, wherein said means comprise at least two hook-shaped elements, which can each be connected to uprights arranged adjacent to each other, via which the headrest is connected to the vehicle seat.

5. A child vehicle seat according to claim 1, wherein the hook-shaped element abuts against the backrest under the influence of spring force of the elastic element when the hook-shaped element is disconnected from the headrest.

6. A child vehicle seat according to claim 1, wherein the backrest is provided with a recess, in which at least the hook-shaped element can be stowed away.

7. A child vehicle seat, comprising:
  a seat portion positionable within a vehicle on a vehicle seat in a forward-facing direction with respect to a forward travel direction of the vehicle, the vehicle seat comprising a headrest disposed on at least two uprights;

a backrest portion extending upwardly from the seat portion, the backrest portion comprising a rear surface positionable adjacent to the vehicle seat;

a band connected at a first end to the rear surface of the backrest portion adjacent a top end of the backrest portion;

an element disposed at a second end of the band, wherein the element is insertable between the at least two uprights when in a first orientation, and wherein the element is positioned against the at least two uprights when in a second orientation, the band extending between the at least two uprights.

8. The child vehicle seat of claim 7, wherein the element is plate shaped with a length greater than a distance between the at least two uprights.

9. The child vehicle seat of claim 7, wherein the element comprises two hook-shaped elements connectable to adjacent ones of the at least two uprights.

10. The child vehicle seat of claim 7, wherein the band is elastic.

11. The child vehicle seat of claim 10, wherein the elastic band biases the element toward the rear surface.

12. The child vehicle seat of claim 7, wherein the band is inelastic.

13. The child vehicle seat of claim 7, further comprising a recess in the backrest portion for stowage of the element.

14. The child vehicle seat of claim 7, further comprising at least two guides in the seat portion to receive at least a portion of a three-point seat belt therein.

* * * * *